US009892878B2

United States Patent
Veil et al.

(10) Patent No.: US 9,892,878 B2
(45) Date of Patent: Feb. 13, 2018

(54) SAFETY SWITCHING APPARATUS FOR SWITCHING-ON OR SWITCHING-OFF A TECHNICAL INSTALLATION

(71) Applicant: Pilz GmbH & Co. KG, Ostfildern (DE)

(72) Inventors: Richard Veil, Ostfildern (DE); Hans Schwenkel, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 280 days.

(21) Appl. No.: 14/831,113

(22) Filed: Aug. 20, 2015

(65) Prior Publication Data

US 2015/0357140 A1    Dec. 10, 2015

Related U.S. Application Data (63) Continuation of application No. PCT/EP2014/053803, filed on Feb. 27, 2014.

(30) Foreign Application Priority Data

Feb. 27, 2013    (DE) .................. 10 2013 101 932

(51) Int. Cl.
*H01H 47/00* (2006.01)
*G05B 9/02* (2006.01)

(52) U.S. Cl.
CPC ............. *H01H 47/004* (2013.01); *G05B 9/02* (2013.01); *H01H 47/005* (2013.01); *Y10T 307/852* (2015.04)

(58) Field of Classification Search
CPC .................................................... H01H 47/002
See application file for complete search history.

(56) References Cited

U.S. PATENT DOCUMENTS 6,198,612 B1    3/2001    Männer
6,417,582 B1    7/2002    Dold et al.
(Continued)

FOREIGN PATENT DOCUMENTS

CN        101395687 A        3/2009
CN        102778851 A        11/2012
(Continued)

OTHER PUBLICATIONS

Chinese Office Action for Appl'n No. 201480010666.3; dated Jul. 26, 2016; 16 pp.
(Continued)

*Primary Examiner* — Hai L Nguyen
(74) *Attorney, Agent, or Firm* — Harness, Dickey & Pierce, P.L.C.

(57) ABSTRACT

A safety switching apparatus for switching-on or switching-off a technical installation has a first input for receiving a first clock signal via a feed line, said first clock signal having a first clock frequency. A failsafe control/evaluation unit processes the first clock signal in a failsafe manner in order to generate an output signal for switching-on or switching-off the technical installation in response to the first clock signal. A clock reference provides a second clock signal having a second clock frequency. A current-increasing circuit having a switching element is arranged for selectively increasing an input current into the first input. The switching element is coupled to the clock reference and selectively activates or deactivates the current-increasing circuit in response to the second clock frequency.

10 Claims, 5 Drawing Sheets

(56) References Cited

U.S. PATENT DOCUMENTS

| | | |
|---|---|---|
| 6,700,382 B2 | 3/2004 | Grassmann |
| 7,933,104 B2 | 4/2011 | Bauer et al. |
| 7,948,391 B2 * | 5/2011 | Pullmann ............. H01H 47/002 |
| | | 307/112 |
| 8,823,413 B2 | 9/2014 | Björklund et al. |
| 8,829,880 B2 | 9/2014 | Oster |
| 9,298,664 B2 * | 3/2016 | Gruber ............... G05B 19/0423 |
| 9,454,140 B2 * | 9/2016 | Godau ................. H01R 9/2458 |
| 2011/0133574 A1 | 6/2011 | Nitsche et al. |

FOREIGN PATENT DOCUMENTS

| | | |
|---|---|---|
| DE | 44 23 704 C1 | 10/1995 |
| DE | 197 02 009 A1 | 7/1998 |
| DE | 197 58 332 A1 | 3/1999 |
| DE | 198 05 722 A1 | 9/1999 |
| DE | 199 36 701 A1 | 2/2001 |
| DE | 100 33 073 A1 | 8/2001 |
| DE | 100 11 211 A1 | 9/2001 |
| DE | 101 18 191 C1 | 11/2002 |
| DE | 10 2004 020 995 A1 | 11/2005 |
| DE | 10 2005 055 325 B3 | 4/2007 |
| DE | 10 2011 015 220 A1 | 9/2012 |
| WO | WO 2012/034594 A1 | 3/2012 |

OTHER PUBLICATIONS

Dipl.-Ing. Dirk Meyer; Effect of the Cable Capacitance of Long Control Cables on the Actuation of Contactors; 2005; 6 pp.

Pilz Operating Instructions No. 19 238-01; Nov. 2004; 6 pp.

EN ISO 13849-1; Safety of machinery—Safety-related parts of control systems—Part 1: General principles for design; Nov. 2006; 97 pp.

International Search Report for PCT/EP2014/053803; dated May 16, 2014; 2 pp.

ISA/EP; English language translation of International Preliminary Report on Patentability (Chapter 1) for PCT/EP2014/053803; dated Sep. 1, 2015; 11 pp.

* cited by examiner

SAFETY SWITCHING APPARATUS FOR SWITCHING-ON OR SWITCHING-OFF A TECHNICAL INSTALLATION

CROSS-REFERENCES TO RELATED APPLICATIONS

This application is a continuation of international patent application PCT/EP2014/053803 filed on Feb. 27, 2014 designating the U.S., which international patent application has been published in German language and claims priority from German patent application DE 10 2013 101 932.3 filed on Feb. 27, 2013. The entire contents of these priority applications are incorporated herein by reference.

BACKGROUND OF THE INVENTION

The present invention relates to a safety switching apparatus for switching-on or switching-off a technical installation and, in particular, to a new approach for processing a clocked input signal fed to such a safety switching apparatus.

An exemplary safety switching apparatus in terms of the present invention is the applicant's safety switching device marketed under the brand name PNOZ® X2, which is described in an operating manual numbered 19 238-01.

More generally, safety switching apparatuses in terms of the present invention are typically used for failsafely switching-off hazardous machines or installations if necessary for the protection of humans. The safety switching apparatuses usually monitor notification signals from emergency stop buttons, safety door switches, light barriers, light grids and other safety-related notification devices. They are able to interrupt, in response to said notification signals, a current supply path to the monitored machine or installation. As can easily be seen, it is very important that the safety function is always guaranteed and that faults in the region of the safety switching apparatus are either overcome and/or detected early. Therefore, safety switching apparatuses are usually designed to be redundant and/or have self-test functions. At least in the case of high demands on safety, the notification signals to the safety switching apparatus are likewise implemented redundantly.

The failsafety which can be achieved by redundancy is lost, however, if a short-circuit occurs in the connection lines between the notification device and the safety switching apparatus. One possibility for preventing a short-circuit is laying the individual connection lines separately. However, this would lead to a confusing and complex cabling between the individual notification devices and the safety switching apparatus and can often not be technically realized, either. Consequently, the redundant connection lines are generally routed through different wires of a multi-core cable. However, this requires the safety switching apparatus to have a separate measure for short-circuit detection.

Essentially two methods for short-circuit detection are known from the prior art. The first method operates with static potentials on the connection lines, which trip a fuse in the event of the two lines being short-circuited. Methods of this kind are known, for example, from DE 44 23 704 C1 or from DE 197 58 332 B4. What is disadvantageous in the case of these methods is that they are substantially dependent on a temperature-dependent fuse, the trip point of which cannot be precisely determined owing to the temperature dependence. This was one of the reasons for which another method using dynamic signals on the connection lines was developed.

In the case of the dynamic methods, differently clocked signals are used on the connection lines to the notification device. As a result, the signals on the separated notification lines differ from one another and a short-circuit can be detected. By way of example, reference is made to DE 100 33 073 A1, DE 197 02 009 C2 and DE 198 05 722 A1. What is disadvantageous in the case of dynamic methods, however, is that the notification signals must first be checked regarding the occurrence of a short-circuit. In other words, in a first step a signal evaluation must occur, wherein the received input signal is usually compared with an expected value. Only after this evaluation can a signal for the outputs be generated by the safety apparatus, said signal leading to switching-off the technical installation, if appropriate.

The afore-mentioned signal evaluation is becoming more and more complicated due to the ongoing reduction of the input currents, by means of which the power loss at the inputs is intended to be reduced. Owing to the reduction of the input currents, power consumption of the control systems is indeed advantageously minimized; however, the lower input currents result in an input being more susceptible to disturbances, as a result of which, in particular, problems may arise in the evaluation of the afore-mentioned dynamic signals. These can be counteracted using additional filters but at a cost to the reaction time of the apparatus.

Disturbances at the inputs occur, in particular, if a notification device, for example a contact switch, is not activated for extended periods and is therefore connected via an "open" line to the safety switching apparatus. In this connection, "open" means that the line is only connected on one side to a defined potential. Open lines are particularly susceptible to disturbance since a signal can be transmitted on the open line, by way of example by a capacitive coupling to a parallel line or by induction in an electromagnetic field. Said disturbance signals increase the error rate when reading the inputs.

SUMMARY OF THE INVENTION

In view of this background, it is an object of the present invention to provide a safety switching apparatus which can be operated with low input currents, but has low error rates and/or enables quick reaction times.

It is another object of the invention to provide a method for receiving a clocked input signal fed to a safety switching apparatus in a manner that combines low power consumption with quick reaction times.

According to one aspect of the invention, there is provided a safety switching apparatus for switching-on or switching-off a technical installation, comprising a first input for receiving a first clock signal via a feed line, said first clock signal having a first clock frequency, comprising a failsafe control/evaluation unit which processes the first clock signal in a failsafe manner in order to generate an output signal for switching-on or switching-off the technical installation in response to the first clock signal, comprising a clock reference providing a second clock signal having a second clock frequency, and comprising a current-increasing circuit having a switching element, said current-increasing circuit arranged for selectively increasing an input current into the first input, wherein the switching element is coupled to the clock reference and selectively activates or deactivates the current-increasing circuit in response to the second clock frequency.

According to another aspect, there is provided a method for failsafely detecting a clocked input signal fed to a safety switching apparatus for switching-on or switching-off a technical installation, the method comprising the steps of receiving said clocked input signal having a first clock frequency, processing the clocked input signal by a failsafe control/evaluation unit, generating an output signal for switching on or switching off the technical installation in response to the clocked input signal, providing a clock reference having a second clock frequency, providing a current-increasing circuit having a switching element, coupling the switching element to the clock reference, and activating or deactivating the current-increasing circuit by means of the switching element in response to the second clock frequency.

The new apparatus and method are based on the concept of actively counteracting possible disturbances at the input by selectively increasing the input current. Preferably, the input current into the first input is cyclically increased. Therefore, the current increase does not take place continuously but at defined instants of time only. When it is active, the current increase facilitates a reliable and quick evaluation of the inputs. It is preferably activated if errors, such as those caused by cross-talk, are to be taken into account in the evaluation of the input signals. Owing to the increased flow of current at the input, a digital state in the form of a defined voltage level at the input is more quickly detectable. In particular, the digital OFF state in which the zero potential is usually expected at the input can be more quickly and more reliably detected.

For this purpose, the safety switching apparatus has a current-increasing circuit with a switching element and a clock reference coupled to the switching element. The current-increasing circuit is switched on and off by the switching element in response to the clock reference at defined instants of time. The current increase, if needed, is therefore selectively switched on at the inputs. The switching-on and switching-off occurs in time with the clock reference, wherein the clock reference is advantageously synchronized to a disturbance signal existent at the input. Cyclical disturbances on the feed line and the read-in errors resulting therefrom can be reduced owing to the selected current increase at the input. Advantageously, the current increase is in this case only active if a disturbance is actually present, with the result that the current consumption and the power loss connected therewith at the input is not substantially increased.

What is advantageous in the case of the apparatus according to the invention is, in particular, the active counteraction in the event of disturbances which is also used for inputs at which no signal is often present but nevertheless a continuous evaluation takes place. The current increase is therefore preferably cyclically activated at all inputs independently of the input signal. In this way, even disturbances which are not caused by the signals present at the input are counteracted. By way of example, this is the case if an external signal is capacitively coupled into a line connecting at the input and thus deviations from an expected defined voltage level occur.

Furthermore, the power loss at the inputs is increased only to a minor amount by the new current-increasing circuit. Owing to the cycling of the current increase by means of the clock reference and the switching element, the current increase is only activated if needed. In other words, a cyclical increase in the input current takes place only if expected disturbances can be counteracted. The frequency $f_R$ of the clock reference is adjusted for this purpose to the frequency of the disturbance signal to be expected. In addition, the switching element is coupled to the clock reference, with the result that the activation of the current-increasing circuit is also synchronized to the occurrence of disturbances. The current-increasing circuit which, when it is continuously switched on, would lead to an increased power loss is therefore only activated for the specific case, with the result that the power loss is limited.

Finally, the new safety switching apparatus has the advantage that the reaction time of the device can be reduced in comparison to other safety switching apparatuses having dynamic short-circuit detection. Owing to the reduced error rate at the input, the signal processing and evaluation is accelerated, as a result of which the reaction time of the entire apparatus is reduced.

Overall, the new safety switching apparatus therefore enables a lower susceptibility to errors when reading-in the inputs and a shortened reaction time as a result. The above-mentioned object is therefore completely achieved.

In a preferred refinement, the current-increasing circuit has a ground connection and a first resistor connected in series with the switching element, wherein the first resistor and the switching element are arranged in parallel with the first input, and the first input is conductively connected to the ground connection via the resistor and the switching element if the current-increasing circuit is switched on.

This refinement makes it possible to implement the current-increasing circuit in a very cost-effective manner. The current-increasing circuit is formed by an additional resistor at the respective input. The current increase at the input is achieved by decreasing the input resistance at the input. In order to switch on the current-increasing circuit, the resistor is connected in parallel with the input by the switching element. A greater current can flow into the inputs via the additional current path.

In a further refinement, the switching element has a defined switching period, wherein the switching period is shorter than a clock reference period $1/f_R$ defined by the clock reference, in particular shorter than ⅕ of the period.

Consequently, the switching period and, connected therewith, the operating period of the current-increasing circuit is shorter than the period of the clock reference frequency $f_R$. The switching element is switched on with the rising edge of the clock reference but already switched off again before the end of the period of the clock reference frequency, preferably before the end of one-fifth of the period. This refinement is advantageous since a disturbance at the input owing to a coupled-in clocked signal generally occurs only when switching on or off. In other words, in this refinement, the current-increasing circuit is only switched on if a disturbance is expected at the input and the disturbance can be counteracted by means of the current increase. In a particularly preferred refinement, the switching period can be variably adjusted, for example via the microcontroller of the control/evaluation unit or via an additional variable adjustment element.

In another refinement, the switching element is coupled to a detector element, wherein the detector element monitors if a defined state has been reached at the input.

In this refinement, the current-increasing circuit is turned off if a defined state at the inputs has been detected by the detector element, which may be implemented in or by the control/evaluation unit. This is particularly advantageous if the signal to be received is a digital signal and a defined state is expected at the input. By way of example, the current increase can be prematurely ended at an input with an open feed line if the value to be expected has already been correctly detected; a disturbance has therefore already been resolved or has not influenced the detection of the digital signal. This likewise contributes to the current-increasing circuit only being activated if it is needed and thus to a current-saving implementation.

In another refinement, the current-increasing circuit has a variable resistor connected in series with the input, wherein the resistor has a maximum and a minimum resistor value, wherein the variable resistor has the minimum resistor value if the current-increasing circuit is switched on.

The series-connected variable resistor at the input is primarily used to limit the current to the input in order to reduce the power loss at the input. Preferably, the variable resistor is an in-phase regulator. In this refinement, a current increase at the input is caused by deactivation of the current limiting. The activation and deactivation is done by the switching element, for example by the voltage reference of the in-phase regulator being deactivated. What is advantageous in the case of this in this refinement is that no additional current-increasing circuit must be added for the event in which the input has a current limiter; rather, only a switchable activation or deactivation of the current limiter must be provided. Alternatively, a current increase at the input and a parallel deactivation of the current limiting can be combined with one another.

In another refinement, the safety switching apparatus has at least one second input with a second current-increasing unit, wherein the switching element switches the first and the second current-increasing circuits on and off.

In addition to the first input, the safety switching apparatus has at least one second input with a further current-increasing circuit. The further current-increasing circuit is advantageously switched on and off via the same switching element as the first current-increasing circuit. By omitting a separate switching element, a current increase can in this way be realized at a plurality of inputs in a cost-effective manner.

In another refinement, the clock reference has at least one external connection for receiving an external signal and the clock reference is synchronized to the external signal.

This refinement is particularly advantageous because the disturbance elimination can be adapted to any disturbance signals. By way of example, a cyclical disturbance signal can be detected at the input using an edge detector and the clock reference is adjusted to this. The frequency $f_R$ of the clock reference can alternatively be synchronized to a signal emitted by the safety switching apparatus, if it is known that this signal is coupled as cross-talk onto a parallel line as a result of capacitive coupling.

Of course, the features mentioned above and still to be explained below can be used not only in the respectively stated combinations but also in other combinations or individually without departing from the scope of the invention.

BRIEF DESCRIPTION OF THE DRAWINGS

Exemplary embodiments of the invention are illustrated in the drawing and are explained in more detail in the following description. In the drawing.

DESCRIPTION OF PREFERRED EMBODIMENTS

Figure 1:
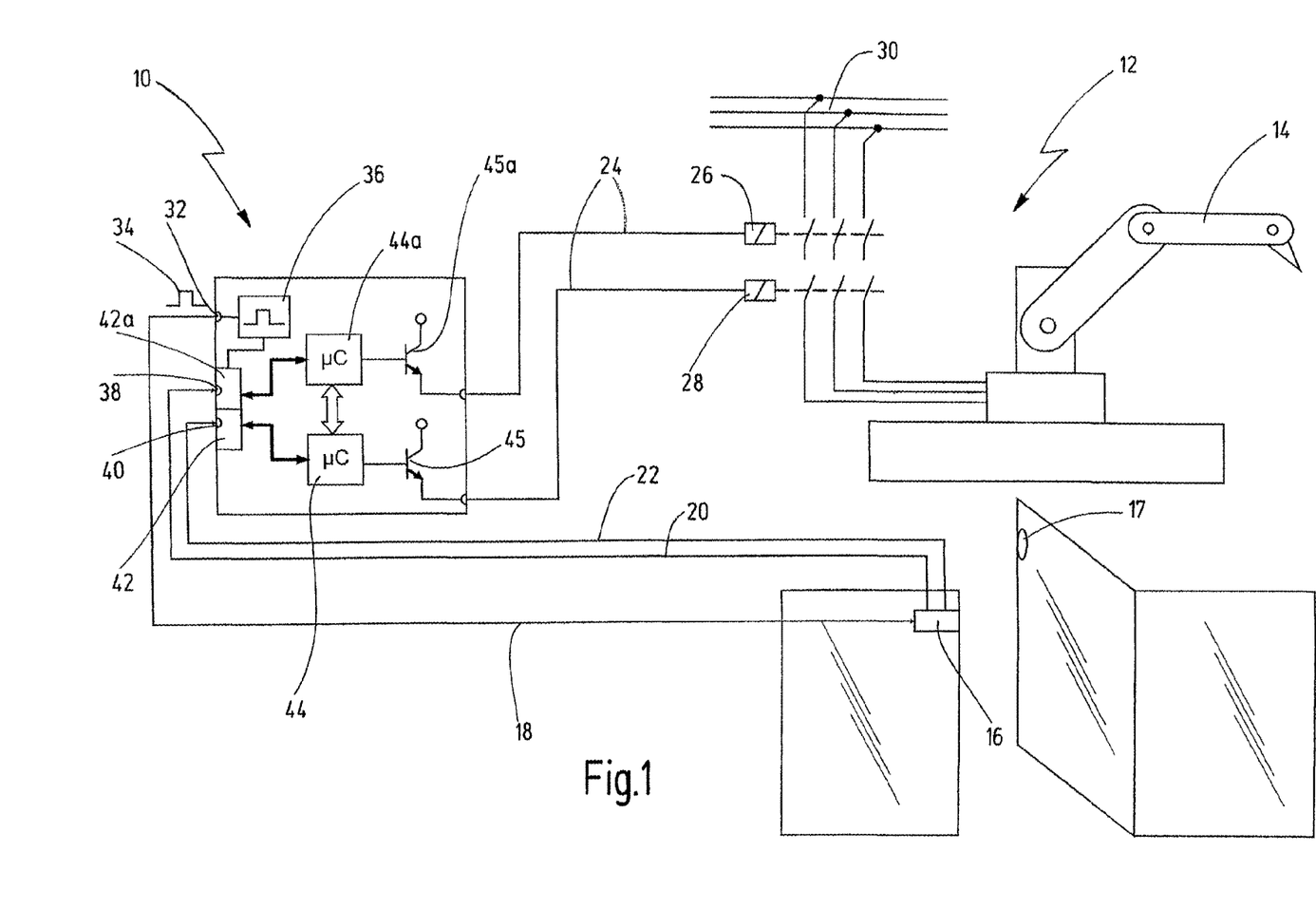
FIG. 1 shows a schematic illustration of an automatically operating installation including a simplified exemplary embodiment of the new safety switching apparatus.

In FIG. 1, a new safety switching apparatus is denoted in its entirety by reference numeral 10.

The new safety switching apparatus 10 is used to monitor and make safe an automatically operating installation 12. A moving robot 14 is illustrated here as an example of said automatically operating installation 12. For the purpose of protection, the robot is in an enclosed area which is safeguarded by a safety door having a safety door switch 16 and associated actuator 17. In the event of unauthorized access, robot 14 is transferred into a safe position or optionally turned off via the safety door switch in conjunction with the safety switching apparatus 10. However, the new safety switching apparatus 10 is not restricted to this specific area of use. The robot 14 could also be made safe using other notification devices, for example an emergency stop switch or a light barrier.

In this exemplary embodiment, the safety door switch 16 is connected via three lines 18, 20, 22 to the safety switching apparatus 10. A signal is transmitted from the safety switching apparatus 10 to the safety door switch 16 via line 18, while the lines 20 and 22 return a signal from the safety door switch 16 to the safety switching apparatus 10. In order to limit the wiring complexity, the three lines 18, 20, 22 are usually wires of a single sheathed cable which is laid from the safety door switch 16 to the safety switching apparatus 10.

The safety switching apparatus 10 is redundantly connected on the output side via line 24 to two contactors 26, 28 the operating contacts of which are arranged in a manner known per se in a power supply line 30 to the robot 14. The safety switching apparatus 10 interrupts the power supply to the robot 14 via contactors 26, 28 if the safety door switch 16 is activated or if an undefined and hence safety-critical state is detected within the scope of the general error monitoring of the safety switching apparatus 10. Such a safety-critical state could occur, for example, owing to a short-circuit between the wires of the sheathed cable, via which the lines 18, 20, 22 are routed, wherein the safety switching apparatus 10 is in principle designed to transfer the technical installation 12 to be monitored into a safe state in the event of an undefined state.

According to a preferred exemplary embodiment, the safety switching apparatus 10 is in this case a device which meets the so-called performance level (PL) of European Standard EN ISO 13849-1 or a comparable safety standard and is correspondingly approved for making safe technical installations. By way of example, it could be a programmable safety switching apparatus, as is marketed by the applicant for the present invention under the brand name PSS®.

In the exemplary embodiment according to FIG. 1, only one notification device in the form of the safety door switch 16 is illustrated. However, it goes without saying that in other exemplary embodiments a plurality of notification devices may also be used, which notification devices each are connected to the safety switching apparatus 10. In this way, the entire system can be made safe in a particularly efficient and cost-effective manner.

The safety switching apparatus 10 has a clock output 32 in this exemplary embodiment. The clock output 32 has a clock signal 34 applied thereto, which clock signal is provided, according to this exemplary embodiment, by a clock reference 36 integrated in the safety switching apparatus. In other exemplary embodiments, the clock signal 34 can also be provided by another device independent of the safety switching apparatus 10. Preferably, the control/evaluation unit 44 "knows" or obtains the clock signal 34 for evaluating an external reference.

Figure 3:
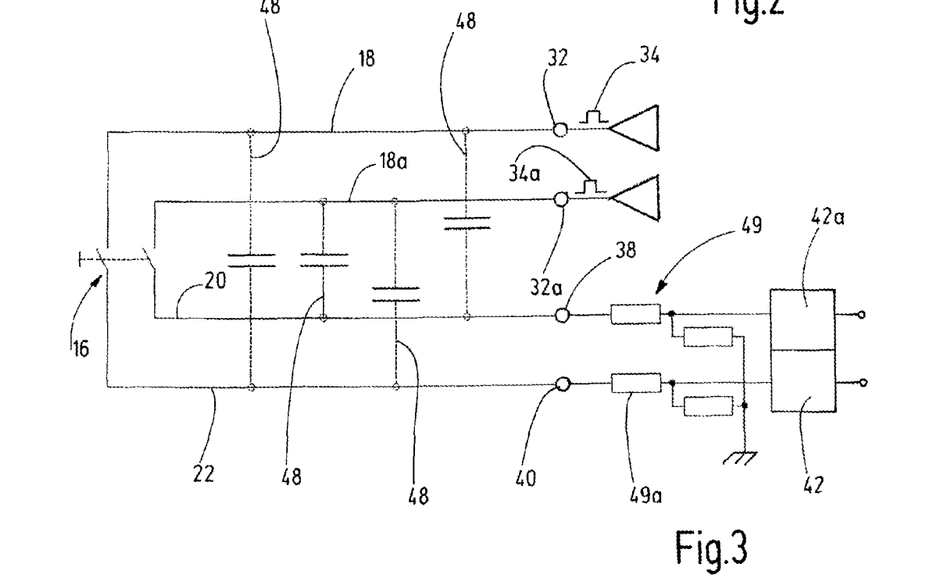

The clock signal 34 is transmitted to the safety door switch 16 via line 18. The safety door switch 16 in turn is connected via lines 20, 22 to a first input 38 and a second input 40 of the safety switching apparatus 10. In this preferred exemplary embodiment, the safety door switch 16 is a two-channel safety door switch 16 with a normally-closed contact and a normally-open contact which can assume two states. In the first state, line 18 is conductively connected to line 20 and, in the second state, line 18 is conductively connected to line 22. Alternatively, the safety door switch 16 can be redundantly connected via two forward and two return lines, as schematically illustrated in FIG. 3.

In this exemplary embodiment, a redundant control/evaluation unit 44 is indicated by two microprocessors 44, 44a, which are coupled to one another. It is designed to evaluate the inputs 38 and 40 by comparing the received clock signal with an expected clock signal. Owing to the comparison, the control/evaluation unit 44 detects which state the safety door switch 16 is in because the clock signal 34 is to be expected at the first input 38 in the first state and at the second input 40 in the second state. The input to which no signal is applied in a state should then have no signal. If the control/evaluation unit 44 detects that the safety door switch 16 has been activated, that is to say in this case that the signal is no longer present on line 20 but on line 22, the contactors 26, 28 are activated via the switching elements 45, 45a and the power supply 30 to the robot 14 is interrupted.

If a signal or an unforeseen potential occurs at the input to which no signal is applied, the safety switching apparatus 10 must assume that an error has occurred on feed line 18, 20, 22, at the inputs 38, 40 or at the safety door switch 16. In this case, the technical installation 12 should likewise be transferred into a safe state by the safety switching apparatus 10. In this way, in particular, short-circuits between the conductors 18, 20, 22 can be detected, which short-circuits may occur if the conductors 18, 20, 22 are routed in a single sheathed cable and said cable is damaged by clamping or bending.

The safety switching apparatus 10 in this case has an input circuit 42 via which the inputs 38, 40 are connected to the control/evaluation unit 44. Preferably, each input has its own associated input circuit 42, 42a. The input circuits 42, 42a are in this case connected to clock reference 36 and are designed to increase the input current in conjunction with clock reference 36 in a manner which is to be described in more detail. The input circuits 42, 42a thus contribute to evaluating the inputs 38, 40 accurately and quickly. A delay caused by the short-circuit detection should thus be compensated by the input circuits 42, 42a.

The input circuits 42, 42a are in this case connected to the clock reference 36, with the result that the current increase here is switched on and off in time with the clock reference 36. Therefore, at the inputs 38, 40, a temporally limited current increase is adjusted via the input circuits 42, 42a. The clock reference 36 is in this connection preferably synchronized to a cyclically occurring disturbance which complicates the evaluation of the signal states at the inputs. A disturbance in this case may be caused, for example, by a capacitive coupling-in of the clock-conducting line 18 on a non-clock-conducting line 20, 22. The increased input current counteracts this because the charging of the line capacitances relevant to the coupling-in is accelerated, and so the disturbance is resolved more quickly. Since the current increase is only adjusted temporarily, a lower power loss is achieved than with permanent current increase. The duration of the current increase is preferably smaller than the period $(1/f_R)$ of the clock reference because a disturbance generally only occurs at the edges of a disturbance signal and the current increase is advantageously only then activated temporarily.

Figure 2:
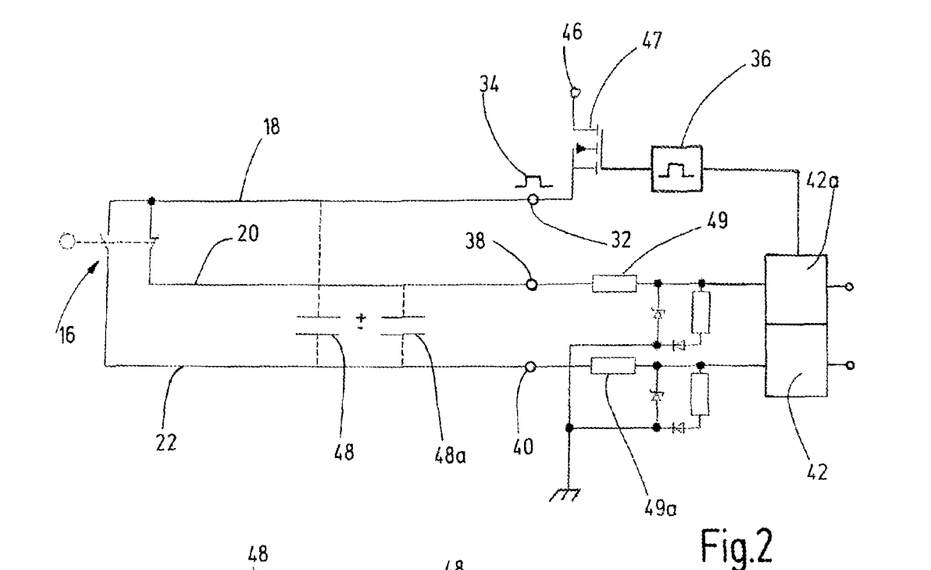
FIG. 2 shows a schematic exemplary embodiment of the new safety switching apparatus, FIG. 3 another schematic exemplary embodiment of the new safety switching apparatus.

FIG. 2 and FIG. 3 show a simplified schematic illustration of how notification devices 16 may be connected to the safety switching apparatus 10. In this case, FIG. 2 shows the exemplary embodiment from FIG. 1 in a simplified manner. FIG. 3 shows an alternative connection of a notification device 16 via redundant feed lines. Identical reference numerals denote identical components to those in FIG. 1.

In FIG. 2, line 18 is connected via a transistor 47 to a supply voltage 46. By cyclically activating transistor 47, clock signal 34 is produced on line 18. The cyclical activation takes place in this case via clock reference 36 which, as in the exemplary embodiment according to FIG. 1, is likewise connected to the input circuits 42, 42a. The line 18 is connected to the safety door switch 16 which is illustrated here by combined normally-open and normally closed contacts. The lines 20, 22 connect the combined normally-open and normally closed contacts via the inputs 38, 40 to the input circuits 42, 42a. The input circuits 42, 42a are connected on the output side to the control/evaluation unit which is not illustrated here.

It can be seen from the illustration that, depending on the state of the safety door switch 16, one of the lines 20, 22 is "open", that is to say does not have a signal applied to it in this state. Open lines are susceptible to cross-talk or interference by other signals, in particular if they are laid parallel to the clock-conducting lines, as in this exemplary embodiment, or are located elsewhere within the area of influence of an electric field.

Line capacitances, which occur between lines 18, 20 and 22, are indicated by reference numeral 48. In the case of a conventional sheathed cable with cross-sections of 1.5 mm², a line capacitance 48 between two wires can be of the order of magnitude of 250 nF/km of sheathed cable. This unavoidable capacitive coupling between the individual wires of a sheathed cable results in a signal passing as cross-talk from line 18 to an open line 20 or 22. In particular, cross-talk occurs if a clocked signal is conducted on one of the lines 18, 20 or 22 and the line capacitances 48, 48a are transferred with each clock change.

FIG. 3 shows a variation to the exemplary embodiments from FIG. 1 and FIG. 2. The switch 16 is in this case a redundant safety switch, for example an emergency stop switch, with two inputs and two outputs and two normally-open contacts. The lines 18, 18a each conduct a clock signal 34, 34a to switch 16 and are separated from the return lines 20, 22 in a first state of switch 16. In a second state, lines 18 and 20, and 18a and 22 are conductively connected to one another. The clock signals 34 and 34a are preferably not synchronous.

In the first state, the lines 20, 22 are "open". Line capacitances 48 occur between the conductors 18, 18a, 20 and 22, as already described in the exemplary embodiment according to FIG. 2, with the result that here, too, disturbance effects at the inputs 38, 40 are to be expected owing to cross-talk. In addition, in this exemplary embodiment, the clock signals 34, 34a are not synchronous. Consequently, a disturbance signal which is passed as cross-talk on the open lines could be a combination of the two clock signals. In a preferred exemplary embodiment, the clock reference is therefore synchronized to a plurality of disturbance signals in order to minimize read-in errors at the inputs in the manner described above.

Figure 4:
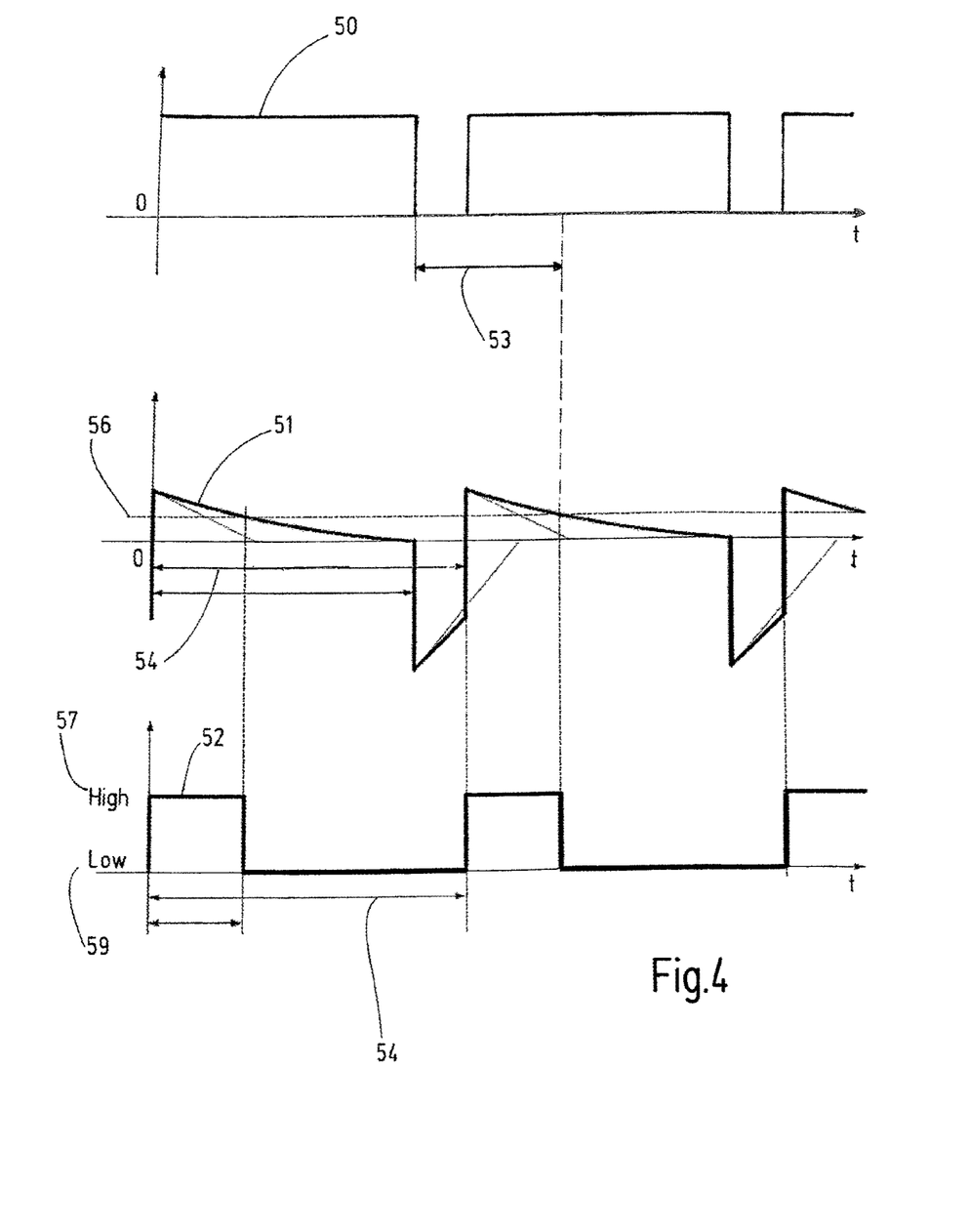
FIG. 4 shows a graphical illustration of a possible disturbance variable at the input of the new safety switching apparatus.

FIG. 4 shows a graphical illustration of a possible disturbance effect on an open line 20, 22, as could occur owing to cross-talk in one of the exemplary embodiments according to FIG. 1, 2 or 3. The clock signal which is passed as cross-talk is represented on the upper graphic by the reference numeral 50. Here, this is a square wave, as used for dynamic short-circuit detection, which is transmitted in a line running parallel to the open line. The curve of the central graphic shows by way of example the analog voltage profile 51 of a disturbance signal on the open conductor into which the clock signal 50 is capacitively coupled.

The voltage profile 51 at the inputs 38 or 40 is essentially determined by the line capacitances 48 and the input resistances 49 of the inputs 38, 40. Each clock change of the clock signal 50 leads to a transfer of the capacitances 48 and to a charge or discharge current. The voltage assumes a maximum value at clock edges of the clock signal and subsequently decays exponentially with the discharge of the line capacitance 48.

The dashed line 56 in this case indicates a threshold value, for example 5 V, a change in the digital state being assumed when said threshold value is exceeded at the input. It can be seen on the graph that the charge and discharge currents can lead to the threshold value 56 being exceeded on the open line.

The curve 52 of the lower graphic shows, in a manner which is temporally synchronous with the voltage profile 51, the resulting digital signal, as present at the control/evaluation unit if the current increase according to the invention is not activated. As long as the threshold value 56 is exceeded, the input is in the HIGH state 57. Only when the cross-talk signal has fallen below the threshold value 56 does the input transfer to the LOW state. In the example shown here, the change occurs after approximately ⅓ of the period 54 of the coupled-in clock signal 50.

Without an input circuit 42, which is described in the following text, the evaluation of the control/evaluation unit 44 is delayed by at least the period 53. A failsafe read-out can only take place when the coupled-in signal has decayed. This leads to an increased reaction time of the overall safety switching apparatus 10, which is not inconsiderable, in particular in the case of fast controllers with processing cycles of less than one millisecond.

Figure 5:
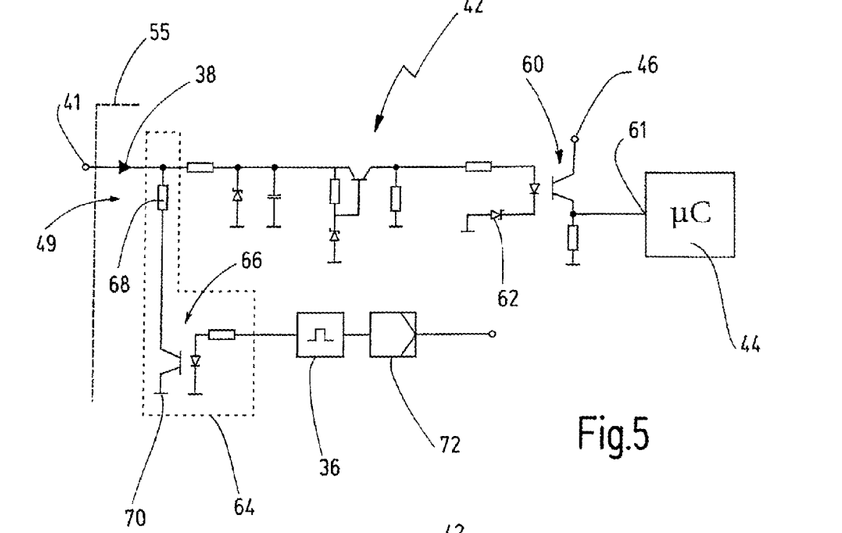
FIG. 5 shows a circuit implementation for an exemplary embodiment of an input of the new safety switching apparatus.

FIG. 5 shows a circuit implementation of an exemplary embodiment of an input circuit 42 of the new safety switching apparatus 10. A notification device (not illustrated here) is connected to the input circuit 42 via a connection terminal 41 on housing 55 of the safety switching apparatus 10. The analog signal coming from the notification device is smoothed, limited and converted into a digital signal. The conversion of the analog signal takes place here by means of an optocoupler 60 which switches the supply voltage 46 on the output side as a HIGH state 57 at the input 61 of the control/evaluation unit 44 when a threshold value 56 is exceeded. The threshold value 56 is in this case set by a Zener diode 62, for example.

Furthermore, the components of a first exemplary embodiment of a current-increasing circuit are combined with reference numeral 64. In addition to switching element 66, the current-increasing circuit 64 here has a resistor 68. The switching element 66 in this case is an optocoupler in order to electrically isolate the input from downstream logic. Alternatively, however, it is possible for another switching element to be used to activate the current-increasing circuit. The resistor 68 and the switching element 66 connect the input 38 to a ground connection 70. The switching element 66 is coupled to the clock reference 36 and is switched on and off at the frequency of the clock reference $f_R$.

If switching element 66 is switched on (in the conductive state), input 38 is connected in parallel to ground 70 via resistor 68. Owing to this additional current path at the input, the input resistance 49 of input 38 is reduced. A higher flow of current into the input results from this owing to Ohm's law.

The clock reference 36 is coupled to the switching element 66 which is activated in time with the clock reference 36. The clock reference 36 is preferably synchronized to the cycle of a disturbance signal occurring cyclically at the input, for example of a signal coupled-in by cross-talk, as illustrated in the central graphic in FIG. 4. The current increase is in this case always activated with the rising edge of the disturbance signal in order to accelerate charging of the line capacitances relevant to the coupling-in, with the result that a defined state can be more quickly adjusted at the inputs. The current increase is deactivated if the disturbance effect is resolved. The switching-off in this case takes place after a defined switching period of the switching element 66 which is adjusted here via adjustment element 72, or actively if the control/evaluation unit has detected a defined state. The adjustment element 72 for adjusting the switching period can also be integrated in the control/evaluation unit 44 in another exemplary embodiment.

Figure 6:
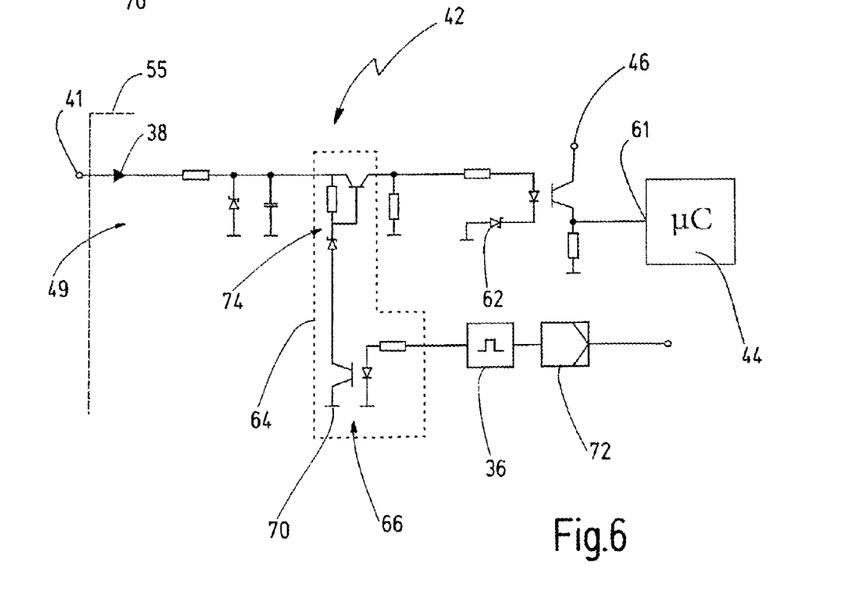
FIG. 6 shows a circuit implementation for another exemplary embodiment of an input of the new safety switching apparatus.

FIG. 6 shows an alternative exemplary embodiment of an input circuit 42 of the new safety switching apparatus 10. In this exemplary embodiment, a limiting element 74, which regulates the flow of current at the input, is deactivated. The limiting element 74 is preferably integrated in the input circuit 42 in the form of an in-phase regulator and keeps the current at the input constant from a defined voltage value.

The limiting element 74 is coupled to the switching element 66, which deactivates and activates the limiting element 74 in time with the clock reference 36 in order thus to enable a higher input current in response to the clock reference. This exemplary embodiment is particularly efficient since no additional components, other than the switching element 66, are added to the input circuit.

In another exemplary embodiment, the exemplary embodiments according to FIG. 5 and FIG. 6 can be combined. In this case, the flow of current at the input is realized firstly by connecting an additional current path and secondly by simultaneous turning-off of the limiting element 74. Both current-increasing circuits are switched in response to the clock reference 36. However, switching takes place in the opposite direction, that is to say while the current increase at the input is activated by an additional current path, the limiting element is deactivated, and vice versa.

Figure 7:
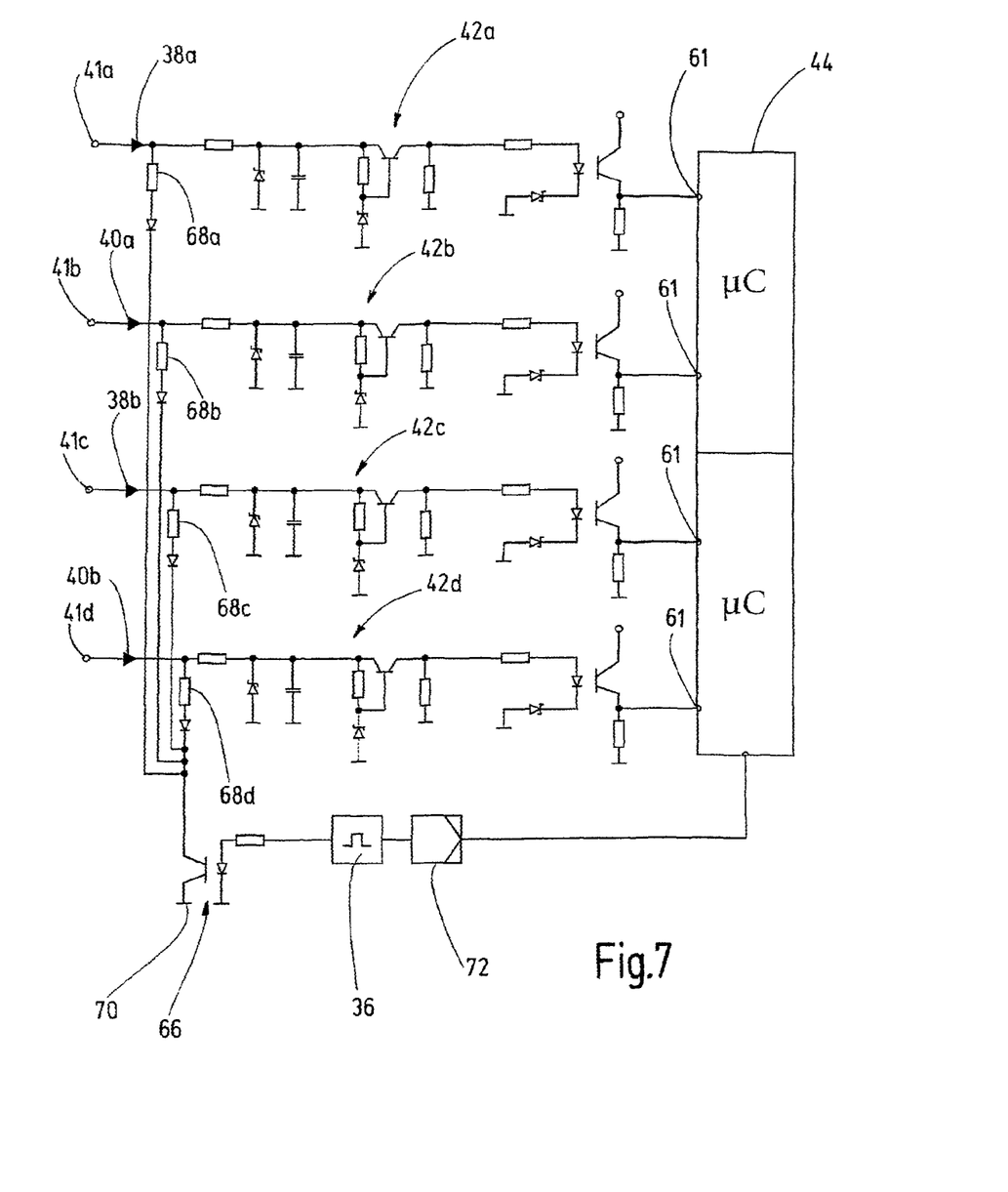
FIG. 7 shows a circuit implementation for another exemplary embodiment with a plurality of inputs.

FIG. 7 shows another exemplary embodiment in which the safety switching apparatus has four inputs 38a, 38b, 40a, 40b. Each of said inputs 38a, 38b, 40a, 40b has its own input circuit 42a, 42b, 42c, 42d in this case. According to a preferred exemplary embodiment, the current-increasing circuits, in this case in the form of resistors 68a, 68b, 68c, 68d, of the input circuits are coupled to the clock reference 36 via a common switching element 66. When the switching element is activated, the current increase is activated at all inputs. In this way, disturbance effects at a plurality of inputs can be cost-effectively and efficiently eliminated using a single switching element.

The above-described devices for increasing current may alternatively also be realized by a current source in all of the exemplary embodiments. A current source would have the advantage over the above implementations that the activated current-increasing circuit constantly supplies a maximally permissible input current independently of the voltage present at the input. However, a current increase using a current source is more expensive than the above implementations.

What is claimed is:

1. A safety switching apparatus for switching-on or switching-off a technical installation, comprising:
   a first input for receiving a first clock signal via a feed line, said first clock signal having a first clock frequency,
   a failsafe control/evaluation unit which processes the first clock signal in a failsafe manner in order to generate an output signal for switching-on or switching-off the technical installation in response to the first clock signal,
   a clock reference providing a second clock signal having a second clock frequency, and
   a current-increasing circuit having a switching element, said current-increasing circuit arranged for selectively increasing an input current into the first input,
   wherein the switching element is coupled to the clock reference and selectively activates or deactivates the current-increasing circuit in response to the second clock frequency.

2. The safety switching apparatus of claim 1, wherein the current-increasing circuit has a ground connection and a first resistor which is connected in series with the switching element, wherein the first resistor and the switching element are arranged in parallel with the first input, and wherein the first input is conductively connected to the ground connection via the resistor and the switching element if the current-increasing circuit is activated.

3. The safety switching apparatus of claim 1, wherein the second clock frequency defines a reference period, and wherein the switching element has a defined switching period which is shorter than the reference period.

4. The safety switching apparatus of claim 3, wherein the defined switching period is shorter than $\frac{1}{5}$ of the reference period.

5. The safety switching apparatus of claim 4, wherein the clock reference has an adjustment element via which the defined switching period can be adjusted.

6. The safety switching apparatus of claim 1, further comprising a detector for detecting when the first clock signal reaches a defined state, said current-increasing circuit being deactivated in response to said defined state.

7. The safety switching apparatus of claim 1, wherein the current-increasing circuit has a variable resistor connected in series with the input, the variable resistor having a maximum and a minimum resistor value, and wherein the current-increasing circuit is activated by controlling the variable resistor to assume the minimum resistor value.

8. The safety switching apparatus of claim 1, further comprising a second input coupled to a further current-increasing unit, wherein the switching element selectively activates or deactivates both the current-increasing circuit and the further current-increasing circuit.

9. The safety switching apparatus of claim 1, wherein the clock reference has an external connection for receiving an external signal, and wherein the clock reference is synchronized to the external signal.

10. A method for failsafely detecting a clocked input signal fed to a safety switching apparatus for switching-on or switching-off a technical installation, the method comprising the steps of:
    receiving said clocked input signal having a first clock frequency,
    processing the clocked input signal by a failsafe control/evaluation unit,
    generating an output signal for switching on or switching off the technical installation in response to the processed clocked input signal,
    providing a clock reference having a second clock frequency,
    providing a current-increasing circuit having a switching element,
    coupling the switching element to the clock reference, and
    activating or deactivating the current-increasing circuit by means of the switching element in response to the second clock frequency.

* * * * *